(12) United States Patent
Zeigler et al.

(10) Patent No.: US 7,454,922 B2
(45) Date of Patent: Nov. 25, 2008

(54) VEHICLE AIR CONDITIONING AND HEATING METHOD PROVIDING ENGINE ON AND ENGINE OFF OPERATION

(75) Inventors: Terry Zeigler, Byron, IL (US); Eric Elias, Loves Park, IL (US)

(73) Assignee: Bergstrom, Inc., Rockford, IL (US)

( * ) Notice: Subject to any disclaimer, the term of this patent is extended or adjusted under 35 U.S.C. 154(b) by 191 days.

(21) Appl. No.: 11/337,624

(22) Filed: Jan. 23, 2006

(65) Prior Publication Data

US 2006/0151164 A1  Jul. 13, 2006

Related U.S. Application Data

(63) Continuation of application No. 11/088,441, filed on Mar. 24, 2005, which is a continuation of application No. 10/134,875, filed on Apr. 29, 2002, now Pat. No. 6,889,762.

(51) Int. Cl.
*F25B 27/00* (2006.01)
*B60H 1/00* (2006.01)
*B60H 1/32* (2006.01)

(52) U.S. Cl. ............ 62/323.1; 165/202; 165/240; 165/271; 62/236; 62/244; 62/323.3; 62/323.4; 123/41.19

(58) Field of Classification Search ............ 165/240, 165/44, 51, 41–43, 202, 271; 62/133, 244, 62/103, 115, 236, 323.1, 323.3, 323.4; 123/142.5 R, 123/41.19
See application file for complete search history.

(56) References Cited

U.S. PATENT DOCUMENTS 3,590,910 A  7/1971  Lorenz
3,627,030 A  12/1971  Lorenz
3,844,130 A  10/1974  Wahnish
3,995,443 A  12/1976  Iversen
4,015,182 A  3/1977  Erdman (Continued)

FOREIGN PATENT DOCUMENTS

DE  100 14 483 A1  11/2000

(Continued)

OTHER PUBLICATIONS

Michael Lohle, Gunther Feuerecler and Ulrich Salzer; NON Idiing HVAC-module for Long Distance Trucks; SAE Technical Paper Series 1999-01-1193; International Congress and Exposition, Detroit, Michingin; Mar. 1-4, 1998; 8 pages.

(Continued)

*Primary Examiner*—Ljiljana (Lil) V Ciric
(74) *Attorney, Agent, or Firm*—Reinhart Boerner Van Deuren P.C.

(57) ABSTRACT

An air conditioning system for use in an over-the-road or off road vehicle that provides operation during both engine on and engine off conditions. The system includes a variable speed compressor, a motor, and a controller. The controller receives electric power from the vehicle's electric power generation system when the engine is on to enable operation of the compressor during an engine on condition. When the engine is off, the controller receives electric power from a battery to enable operation of the compressor during the engine off condition.

17 Claims, 6 Drawing Sheets

U.S. PATENT DOCUMENTS

| | | | |
|---|---|---|---|
| 4,324,286 A | | 4/1982 | Brett |
| 4,359,875 A | | 11/1982 | Ohtani |
| 4,448,157 A | * | 5/1984 | Eckstein et al. ....... 123/142.5 R |
| 4,459,519 A | | 7/1984 | Erdman |
| 4,577,679 A | | 3/1986 | Hibshman |
| 4,604,036 A | | 8/1986 | Sutou et al. |
| 4,667,480 A | | 5/1987 | Bessler |
| 4,694,798 A | | 9/1987 | Kato et al. |
| 4,856,078 A | | 8/1989 | Konopka |
| 5,025,634 A | | 6/1991 | Dressler |
| 5,067,652 A | | 11/1991 | Enander |
| 5,125,236 A | | 6/1992 | Clancey et al. |
| 5,170,639 A | | 12/1992 | Datta |
| 5,275,012 A | | 1/1994 | Dage et al. |
| 5,316,074 A | | 5/1994 | Isaji et al. |
| 5,361,593 A | | 11/1994 | Dauvergne |
| 5,376,866 A | | 12/1994 | Erdman |
| 5,396,779 A | | 3/1995 | Voss |
| 5,465,589 A | | 11/1995 | Bender et al. |
| 5,497,941 A | | 3/1996 | Numazawa et al. |
| 5,501,267 A | | 3/1996 | Iritani et al. |
| 5,524,442 A | | 6/1996 | Bergman, Jr. et al. |
| 5,528,901 A | | 6/1996 | Willis |
| 5,657,638 A | | 8/1997 | Erdman et al. |
| 5,682,757 A | | 11/1997 | Peterson |
| 5,782,610 A | | 7/1998 | Ikeda |
| 5,819,549 A | | 10/1998 | Sherwood |
| 5,898,995 A | | 5/1999 | Ghodbane |
| 5,899,081 A | | 5/1999 | Evans et al. |
| 5,901,572 A | | 5/1999 | Peiffer et al. |
| 5,901,780 A | | 5/1999 | Zeigler et al. |
| 5,921,092 A | | 7/1999 | Behr et al. |
| 5,934,089 A | | 8/1999 | Nakagawa et al. |
| 6,016,662 A | | 1/2000 | Tanaka et al. |
| 6,028,406 A | | 2/2000 | Birk |
| 6,038,877 A | | 3/2000 | Peiffer et al. |
| 6,059,016 A | | 5/2000 | Rafalovich et al. |
| 6,073,456 A | * | 6/2000 | Kawai et al. .................. 62/133 |
| 6,112,535 A | | 9/2000 | Hollenbeck |
| 6,134,901 A | | 10/2000 | Harvest et al. |
| 6,152,217 A | | 11/2000 | Ito et al. |
| 6,205,795 B1 | | 3/2001 | Backman et al. |
| 6,230,507 B1 | | 5/2001 | Ban et al. |
| 6,253,563 B1 | | 7/2001 | Ewert et al. |
| 6,276,161 B1 | | 8/2001 | Peiffer et al. |
| 6,405,793 B1 | | 6/2002 | Ghodbane et al. |
| 6,453,678 B1 | | 9/2002 | Sundhar |
| 6,457,324 B2 | | 10/2002 | Zeigler et al. |
| 6,467,279 B1 | | 10/2002 | Backman et al. |
| 6,530,426 B1 | | 3/2003 | Kishita et al. |
| 6,626,003 B1 | | 9/2003 | Kortüm et al. |
| 6,684,863 B2 | | 2/2004 | Dixon et al. |
| 6,725,134 B2 | | 4/2004 | Dillen et al. |
| 6,745,585 B2 | | 6/2004 | Kelm et al. |
| 6,889,762 B2 | | 5/2005 | Zeigler et al. |
| 2001/0010261 A1 | | 8/2001 | Oomura et al. |
| 2002/0026801 A1 | | 3/2002 | Yamashita |
| 2002/0108384 A1 | | 8/2002 | Higashlyama |
| 2002/0112489 A1 | * | 8/2002 | Egawa et al. .................. 62/133 |
| 2002/0157413 A1 | | 10/2002 | Iwanami et al. |
| 2003/0106332 A1 | | 6/2003 | Okamoto |
| 2004/0168449 A1 | | 9/2004 | Homan et al. |
| 2005/0161211 A1 | | 7/2005 | Zeigler et al. |
| 2006/0102333 A1 | | 5/2006 | Zeigler et al. |
| 2006/0151163 A1 | | 7/2006 | Zeigler et al. |
| 2006/0151164 A1 | | 7/2006 | Zeigler et al. |
| 2007/0131408 A1 | | 6/2007 | Zeigler et al. |

FOREIGN PATENT DOCUMENTS

| | | |
|---|---|---|
| EP | 1 024 038 A2 | 8/2000 |
| WO | WO 99/661269 | 12/1999 |

OTHER PUBLICATIONS

Mahmoud Ghodbane; On Vehicle Performance of a Secondary Loop A/C System; SAE Technical Paper Series 2000-01-1270;SAE 2000 World Congress, Detroit, Michingan; Mar. 6-9, 2000; 6 pages.

Masami Konaka and Hiroki Matsuo; SAE Technical Paper Series 2000-01-1271; SAE 2000 World Congress, Detroit, Michigan; Mar. 6-9-2000; 6 pages.

Frank Stodolsky, Linda Gaines, and Anant Vyas; Analysis of Technology Options to Reduce the Fuel Consumption of Idiling Trucks; Paper-Center for Transportation Research, Enegy Systems Divsion, Argonne National Laboratory, 9700 South Cass Avenue, Argonee, Illinois 60439; Jun. 2000; 30 pages.

Patricia Gardie and Vincent Goetz; Thermal EnergyStorage System by Solid Absorpation for Electric Automobile Heating and Air-Conditioning; Paper; 5 pages.

TropiCool No-idle Heating & Coolong. 110V/12V High-efficiency, Self-contained, Electrified Heating/AC System; ACC Climate Control Brochure, Elkhart, Indiana; 1 page.

TropiCool Power Plus, More comfort. More efficiency. More options.; ACC Climate Control Brochure, Elkhart, Indiana; 3 pages.

Packless Industries, the leader in regriderant to water coaxial heat exchangers, flexible hoses and sucti . . .; website—http://www.packless.com/profile.html; data last visited Aug. 9, 2007; 1 page.

FlatPlate Heat Exchageer; GEA FlatPlate Inc.; website—http://www.flatplate.com/profile.htm; date last visited Aug. 9, 2007; 3 pages.

Alfa Laval website http://www.alfalaval.com/ecoreJava/WebObjects/ecoreJava.woa/wa/showNode?siteNodelID=1668 &cont . . . ; date last visited May 18, 2007; 1 page.

\* cited by examiner

VEHICLE AIR CONDITIONING AND HEATING METHOD PROVIDING ENGINE ON AND ENGINE OFF OPERATION

CROSS-REFERENCE TO RELATED PATENT APPLICATION

This patent application is a continuation of co-pending U.S. patent application Ser. No. 11/088,441, filed Mar. 24, 2005, entitled "Vehicle Air Conditioning and Heating System Providing Engine On And Engine Off Operation", which is a continuation of U.S. patent application Ser. No. 10/134,875, filed Apr. 29, 2002, now U.S. Pat. No. 6,889,762, the entire teachings and disclosure of which are hereby incorporated in their entireties by reference thereto.

FIELD OF THE INVENTION

The present invention relates generally to over-the-road and off-road vehicle air conditioning systems, and more particularly to vehicle mounted heating, ventilation, and air conditioning (HVAC) systems utilizing variable speed motor driven compressors and controls therefor.

BACKGROUND OF THE INVENTION

The global economic expansion has stressed the transportation industry's ability to keep up with the shipping demands for raw materials and finished products. Indeed, the demand for qualified tractor-trailer drivers has far outstripped the ability of the industry to recruit and train individuals to fill the demand of the marketplace. As a result, the demand of the transportation industry to utilize the existing personnel and vehicles has resulted in increased time spent on the road and in the vehicles in an attempt to meet the market demands.

In an effort to maintain the safety of the highways, federal regulations governing the amount of time that a driver may spend behind the wheel have been instituted. When such maximum times have been reached, the driver is required to take his vehicle off the road and rest. The number of trucks pulled over at toll plazas, weight stations, and rest stops illustrates the compliance with such regulations. However, these locations often do not provide anywhere for the drivers to rest, necessitating continued occupancy within the vehicle.

In response to the needs of the transportation industry and in recognition of the locations where drivers are forced to rest, over-the-road vehicle manufacturers have continued to increase the emphasis on ergonomic factors in the design and manufacturer of their vehicles. Indeed, the interior of a modern over-the-road vehicle contains many features to minimize the stress and fatigue placed on the drivers during the operation of the vehicle. These features include vibration dampers and lumbar supports in the seats, increased sound insulation, and heating, ventilation, and air conditioning (HVAC) systems that provide a comfortable environment for the driver. To accommodate the required rest periods, and in recognition of the increased usage of driving teams, which typically include two individuals, one who drives while the other sleeps, many over-the-road vehicles include a sleeping compartment. This sleeping compartment is also temperature controlled so that time spent therein provides the occupant with a restful experience.

Unfortunately, the current state-of-the-art heating and air conditioning systems utilize engine-belt driven compressors for the air conditioning system to circulate and pump the refrigerant throughout the vehicle to cool the passenger compartments. An engine-belt driven pump is also utilized to circulate the engine waste heat throughout the passenger compartments when heating is required. While such systems are ideally suited to provide a temperature controlled environment during operation of the vehicle, neither of such systems is able to operate when the engine is turned off.

As a result of the inability of the current state of the art of vehicle HVAC systems to operate while the vehicle's engine is turned off, the over-the-road vehicle operators are forced to choose between two less than ideal situations while trying to rest. First, they may choose to continuously run their vehicle's engine so that they may have heating or air conditioning while they rest. Alternatively, they may choose to turn off their engine and try to rest in a non-temperature controlled environment, although temperatures can often reach extremes of high and low depending on where the vehicle happens to be when a required rest period is reached. While the first option improves safety by providing a comfortable resting environment for the driver, it greatly increases the cost of operating the over-the-road vehicle as the engine is continued to run, which burns additional fuel, simply to operate the heating or air conditioning system. Similarly, while the second option does not increase the cost of operating the vehicle because the engine is turned off, the driver may not fully be able to rest in an environment of temperature extremes, thus potentially reducing the safety of the operation of the vehicle.

There exists, therefore, a need in the art for a vehicle heating, ventilation, and air conditioning (HVAC) system that is able to provide conditioning of the interior of the vehicle, not only during periods of engine operation, but also during engine off or no-idle conditions.

BRIEF SUMMARY OF THE INVENTION

In view of the above, the present invention provides a new and improved heating, ventilating, and air conditioning (HVAC) system for an over-the-road vehicle that may be operated regardless of the operational state of the engine. That is, the instant invention provides a new and improved HVAC system that may be operated to condition the interior compartments of an over-the-road vehicle while the engine is running and while the engine is in a no-idle (off) condition.

In one embodiment to the present invention the air conditioning system's compressor is driven by a variable-speed brushless DC motor controlled by an intelligent power generation management controller. In this way, the system can be driven from any available electrical power source, including the vehicle's electric power generation system during engine operation, or from a storage battery, an auxiliary power unit, or shore power during engine off or no-idle operation. The intelligent power generation management controller is provided to monitor the HVAC system parameters and the operational condition of the engine to select the power source, operating mode, and control the operational capacity for the system. That is, under engine operating conditions the HVAC system may be operated at maximum capacity as supplied by the vehicle's electric power generation system. When the engine is turned off, the intelligent power generation management controller will begin utilizing another source of electric power to drive the variable speed motor.

This controller will modulate the operating capacity of the HVAC system based upon the available source of power such that, for example, the air conditioning system compressor may be operated at minimum capacity when the only available power source is the vehicle's storage battery. Indeed, the controller also includes logic that will disable the HVAC system when the vehicle's storage battery has been discharged a predetermined amount so that enough capacity is preserved in the storage battery to start the vehicle and/or to limit the battery discharge level to provide proper life the battery system.

In one embodiment of the present invention, an air conditioning system for use in an over-the-road vehicle is presented. This system comprises a variable-speed compressor for providing refrigerant to a heat exchanger positioned to provide temperature control to an interior compartment of a vehicle. A brushless DC motor is operably coupled to the variable-speed compressor, and an intelligent power generation management controller is operably coupled to the motor. The controller receives electric power from at least one source of electric power that is operable when the engine of the vehicle is not operating. The controller then modulates the speed of the compressor when the engine is not operating by varying an energization of the motor based on a power capacity of the source. In this way, the controller enables operation of the compressor during an engine off condition.

Preferably, the source of electric power is a battery. In such a case, the controller operates the compressor at minimum speeds to extend a duration of operation of the air conditioning system. The controller monitors a voltage of the battery and disables operation of the compressor when the voltage drops below a predetermined set point. In one embodiment the predetermined set point is set at approximately 11.5 volts. Alternatively, the predetermined set point is determined by a starting power requirement of the vehicle's engine. When the source of electric power is shore power or auxiliary power, the controller can operate the compressor at minimum and maximum speeds depending on performance output requirements. In a further embodiment, the controller receives electric power from an engine driven electric power system and operates the compressor at the desired speed based on performance output requirements.

In a preferred embodiment of the system of the present invention, the controller is adapted to receive electric power from a plurality of sources of electric power operable when the engine of the vehicle is not operating and from at least one source of electric power operable when the engine is operating, and wherein the controller dynamically utilizes electric power from one of the sources based on priority logic of available sources. Preferably, sources operable when the engine is not operating include a battery, shore power, and an auxiliary power unit, and the source operable when the engine is operating is the vehicle's electric power system. The priority logic selects the vehicle's electric power system, the shore power, the auxiliary power unit, and the battery, in that order, based on each of these sources availability. In one embodiment the system also includes a heater. In this embodiment the controller disables the compressor and operates the heater to provide heating to the interior compartment of the vehicle when required.

In an alternate embodiment of the present invention, a heating, ventilation, and air conditioning (HVAC) system for a vehicle is provided. This HVAC system comprises a high pressure coolant loop including a motor-driven compressor and a refrigerant to liquid heat exchanger, and a low pressure coolant loop in thermal communication with the high pressure coolant loop via the refrigerant to liquid heat exchanger. The low pressure coolant loop includes a coolant pump and a liquid to air heat exchanger positioned in thermal communication with an interior compartment of the vehicle. An intelligent power generation management controller is operably coupled to the motor-driven compressor. Advantageously, the controller receives electric power from at least one source of electric power that is operable when an engine of the vehicle is not operating. The controller modulates the speed of the motor-driven compressor and operates the coolant pump when the engine is not operating based on a power capacity of the source of electric power. In this way, the controller prolongs operation of the HVAC system during an engine off condition when interior cooling is required.

Preferably, the low pressure coolant loop includes a coolant heater. The controller can then disable operation of the compressor and operate the coolant heater and the coolant pump when the engine is not operating based on a power capacity of the source of electric power to prolong operation of the HVAC system during an engine off condition when interior heating is required. In an alternate embodiment of the present invention, a resistance type air heater is positioned in thermal communication with the interior compartment of the vehicle. The controller then disables operation of the compressor and the coolant pump and operates the air heater when the engine is not operating based on a power capacity of the source of electric power to prolong operation of the HVAC system during an engine off condition when interior heating is required.

Further, the controller receives electric power from a plurality of sources of electric power that are operable when the engine of the vehicle is not operating and at least one source of electric power operable when the engine of the vehicle is operating. The controller then selectively utilizes electric power from one of the sources based on internal priority logic. When the source of electric power utilized is a battery, the controller operates the compressor at a minimum speed to extend a duration of operation of the HVAC system. Preferably, the controller monitors the power utilization of the battery and disables operation of the compressor to preserve an amount of power in the battery sufficient to start the vehicle's engine.

In a further alternate embodiment of the present invention, a heating, ventilation, and air conditioning (HVAC) system for a vehicle comprises a high pressure coolant loop including a motor-driven compressor and a refrigerant to liquid heat exchanger, a heater, and a low pressure coolant loop in thermal communication with the high pressure coolant loop via the refrigerant to liquid heat exchanger. The low pressure coolant loop includes a coolant pump and a liquid to air heat exchanger positioned in thermal communication with an interior compartment of the vehicle. An intelligent power generation management controller is operably coupled to the motor-driven compressor, the coolant pump, and the heater. The controller receives electric power from at least one source of electric power that is operable when an engine of the vehicle is not operating. The controller then modulates a speed of the motor-driven compressor and operates the coolant pump when the engine is not operating based on a power capacity of the source of electric power to prolong operation of the HVAC system during an engine off condition when interior cooling is required. Further, the controller disables operation of the compressor and operates the heater when the engine is not operating based on a power capacity of the source of electric power to prolong operation of the HVAC system during an engine off condition when interior heating is required.

In one embodiment the heater is a coolant heater in thermal communication with the low pressure coolant loop. The controller then operates the coolant heater and the coolant pump when interior heating is required. In another embodiment the heater is a resistance type or fuel fired air heater. In this embodiment the controller disables operation of the compressor and the coolant pump, and operates the air heater when interior heating is required.

Other features and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
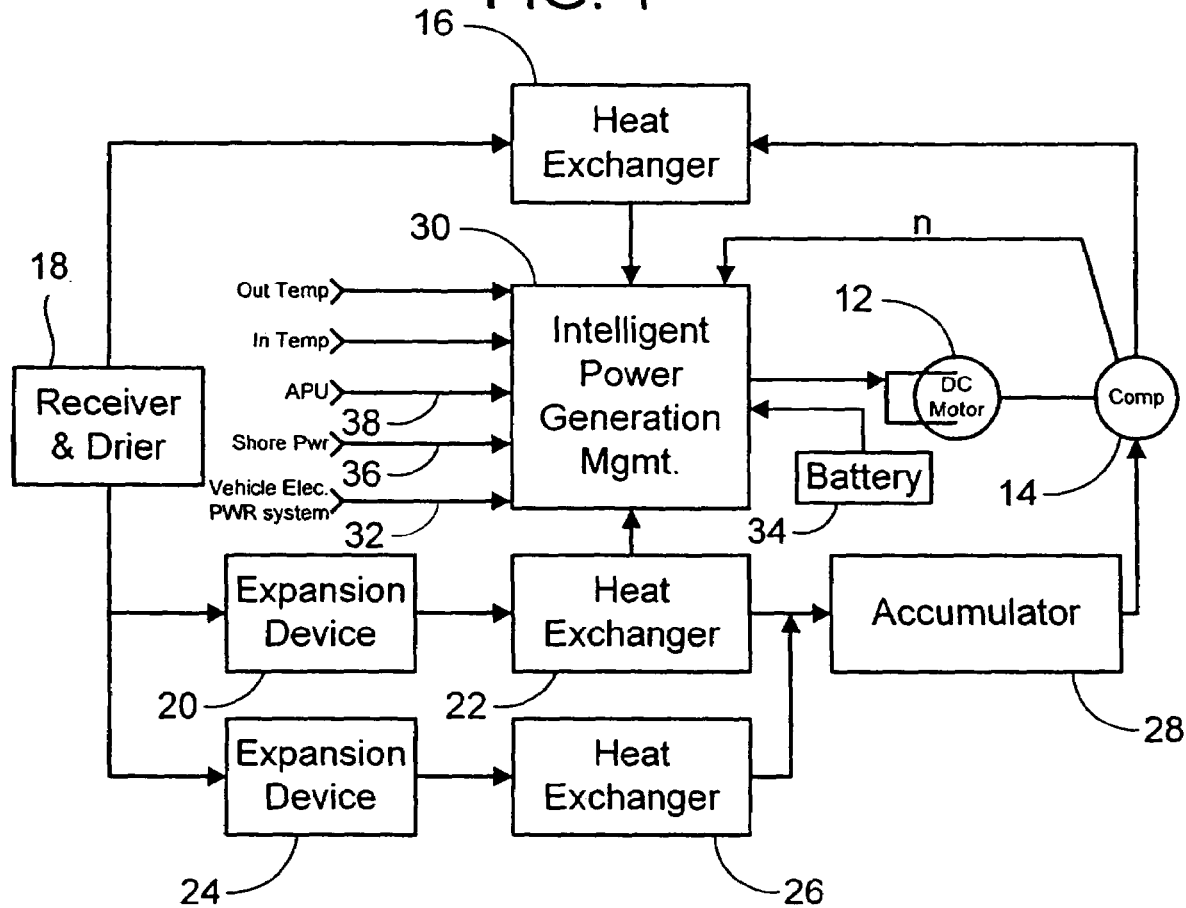
FIG. 1 is a simplified single line block diagram illustrating coolant flow and system component interconnections in an air conditioning system constructed in accordance with the teachings of the present invention.

FIG. 1 illustrates, in simplified block diagrammatic form, an embodiment of an air conditioning system of particular applicability to an over-the-road or off-road commercial vehicle. Unlike conventional vehicle air conditioning systems, the system 10 of the present invention utilizes a brushless DC motor 12 to drive a variable speed compressor 14. This variable speed, brushless DC motor-driven compressor 14 circulates refrigerant through a refrigerant-to-liquid or refrigerant-to-air heat exchanger 16 to an optional refrigerant receiver and dryer 18. The refrigerant then passes through an expansion device 20 and a refrigerant-to-air heat exchanger 22 to cool the passenger compartment.

In one embodiment of the present invention, a secondary parallel coolant loop is provided through expansion device 24 and refrigerant-to-air heat exchanger 26. Such secondary, parallel coolant loops are often used to directly cool the sleeping compartment of an over-the-road vehicle's cab. As such, the heat exchanger 26 is typically smaller than the heat exchanger 22 as the volume for which it is responsible is reduced compared to the primary driver/passenger compartment of the cab. While not illustrated in FIG. 1, the two refrigerant coolant loops may be selectively coupled via a valve. The inclusion of such a valve allows, for example, only the sleeping compartment to be air conditioned when no occupant is in the main passenger compartment of the cab and vise versa to increase the efficiency of the system. The refrigerant then passes through an operational refrigerant accumulator 28 before being returned to the compressor 14.

By utilizing a variable speed compressor 14 driven by brushless DC motor 12, the vehicle's air conditioning system may be operated during both engine on and engine off (no idle) conditions. The provision of the variable speed compressor 14 also allows the system to operate at a lower capacity during engine off operation to conserve the amount of stored energy available for usage by the system from the vehicle's batteries 34. The control for this operation is provided by an intelligent power generation management controller 30 that monitors various system parameters and the availability of power sources on the vehicle.

In this way, the vehicle's air conditioning system is now capable of being powered by either the vehicle's main electric power generation system 32, which is available while the vehicle's engine is operating, or by the electrical system while the engine is off by utilizing the stored electric power in the battery storage system 34. Additionally, the intelligent power generation management controller 30 also has the capability utilizing shore power 36 or power from an auxiliary electric power unit 38, such as a genset or fuel cell.

In the system 10 of the present invention, the use of the electric driven compressor 14 provides the ability to modulate its output from full capacity to low capacity. This allows the use of a single air conditioning system that can be used for both high load on-road operations with the engine operating, and at a lower capacity with the engine off to continue to cool the passenger compartments. Coordination of this modulation is provided by the intelligent power generation controller 30, which reduces the speed of the compressor when lower capacity power sources are only available. This modulation extends the duration of available operation from such power sources. That is, with a reduced speed of the compressor, the electric power demand is reduced as well.

Figure 2:
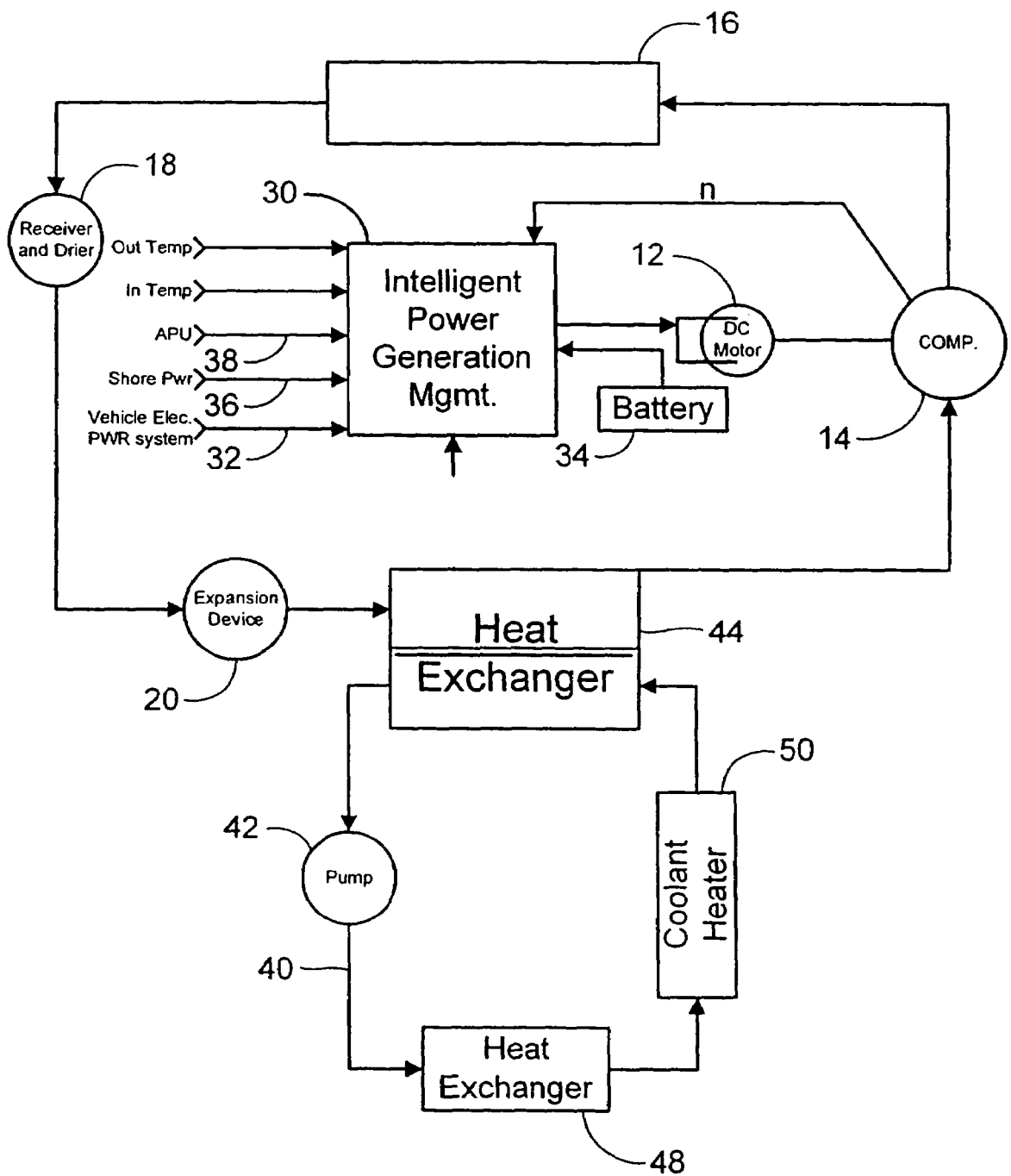
FIG. 2 illustrates an alternate embodiment of the invention forming a HVAC system capable of providing both heating and cooling of a passenger compartment of an over-the-road vehicle.

As illustrated in FIG. 2, an alternate embodiment of the system of the present invention includes a high pressure coolant loop 46 and a low pressure coolant loop 40 in a full HVAC system. The high pressure coolant loop 46 is driven by the compressor 14, and may be constructed as a modular, sealed refrigeration power cell having fixed tubing with permanent connections. The low pressure coolant loop 40 utilizes a low pressure coolant pump 42 to circulate the low pressure coolant through a refrigerant-to-liquid heat exchanger 44 that serves as the heat exchange medium between the high pressure coolant loop 46 and this secondary loop 40. Such a configuration is described in U.S. Pat. No. 6,276,161, entitled Modular Low Pressure Delivery Vehicle Air Conditioning System, assigned to the assignee of the instant application, the disclosure and teachings of which are hereby incorporated in their entireties by reference thereto. In such a configuration, the primary high pressure coolant loop 46 may be manufactured as a single integrated module having fixed tubing and permanent connections between the components thereof. As described in the above-identified patent, such a configuration minimizes the possibility of refrigerant leaks through high pressure couplings.

As illustrated in FIG. 2, the secondary low pressure coolant loop 40 uses a treated liquid-to-air heat exchanger 48 located within the vehicle's interior to provide cooling to the passenger compartments. To provide heating of the vehicle passenger compartments a coolant heater 50 may be utilized in the secondary low pressure coolant loop 40. During such heating operation, the intelligent power generation management controller 30 need only operate the secondary loop coolant pump 42 and the coolant heater 50 to provide this functionality. That is, no power need be delivered to the variable speed motor driven compressor 14 in this mode of operation, thereby further reducing the power consumption during engine off operation and extending the period of time that such operation is available.

Figure 3:
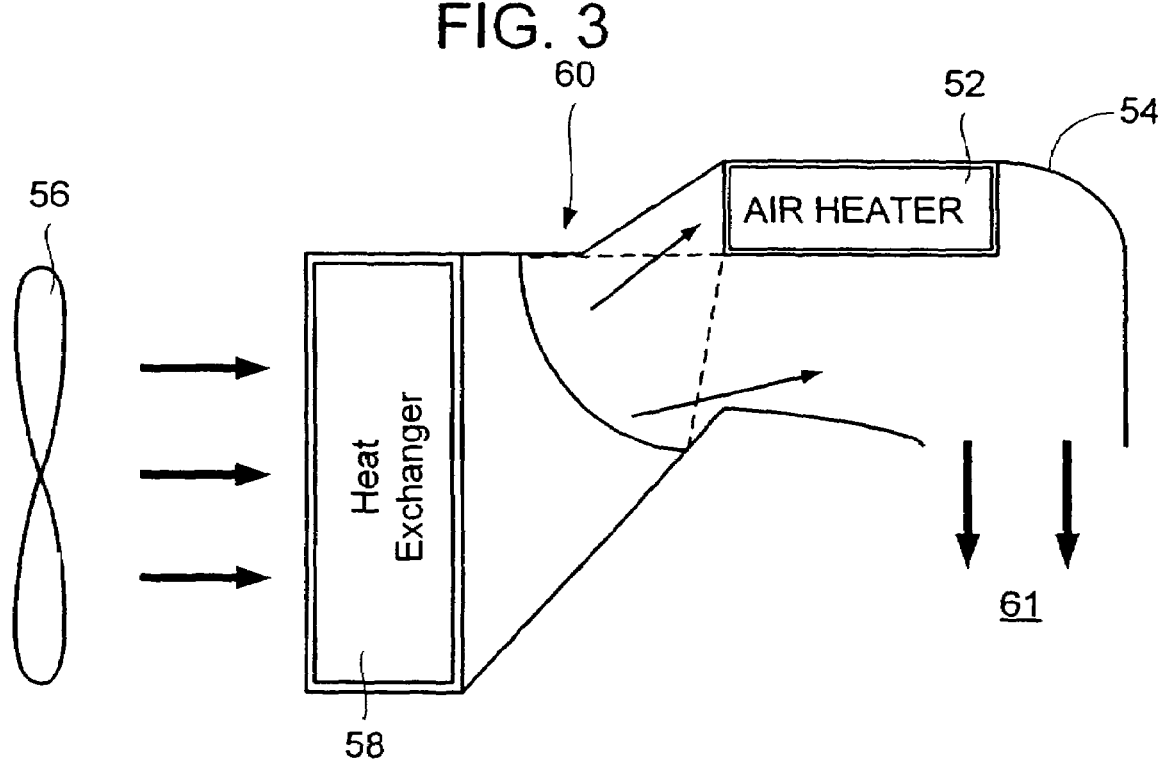
FIG. 3 is a simplified air flow diagram illustrating an alternate embodiment of an HVAC system constructed in accordance with the teachings of the present invention incorporating an air heater.

In an alternate embodiment illustrated in FIG. 3, an air heater 52 may be provided in the air outlet duct 54 of the vehicle HVAC system. This may be a fuel fired heater (FFH) or a resistance-type heater. In this configuration, the intelligent power generation management controller 30 need not operate either the high pressure loop or the low pressure coolant loop, but instead only operate a circulation fan 56 and the air heater 52 to provide the necessary heating for the vehicle passenger compartments. This configuration provides additional power consumption savings and allows for a longer duration operation of the system in the heating mode. In the cooling mode of operation, the compressor will be operated to circulate refrigerant through the high pressure refrigerant to air or low pressure liquid to air heat exchanger 58. A mode door and/or temperature control door 60 controls the flow of air through the duct 54 to regulate the temperature of the air flowing into the vehicle passenger compartments as is known in the art.

Figure 4:
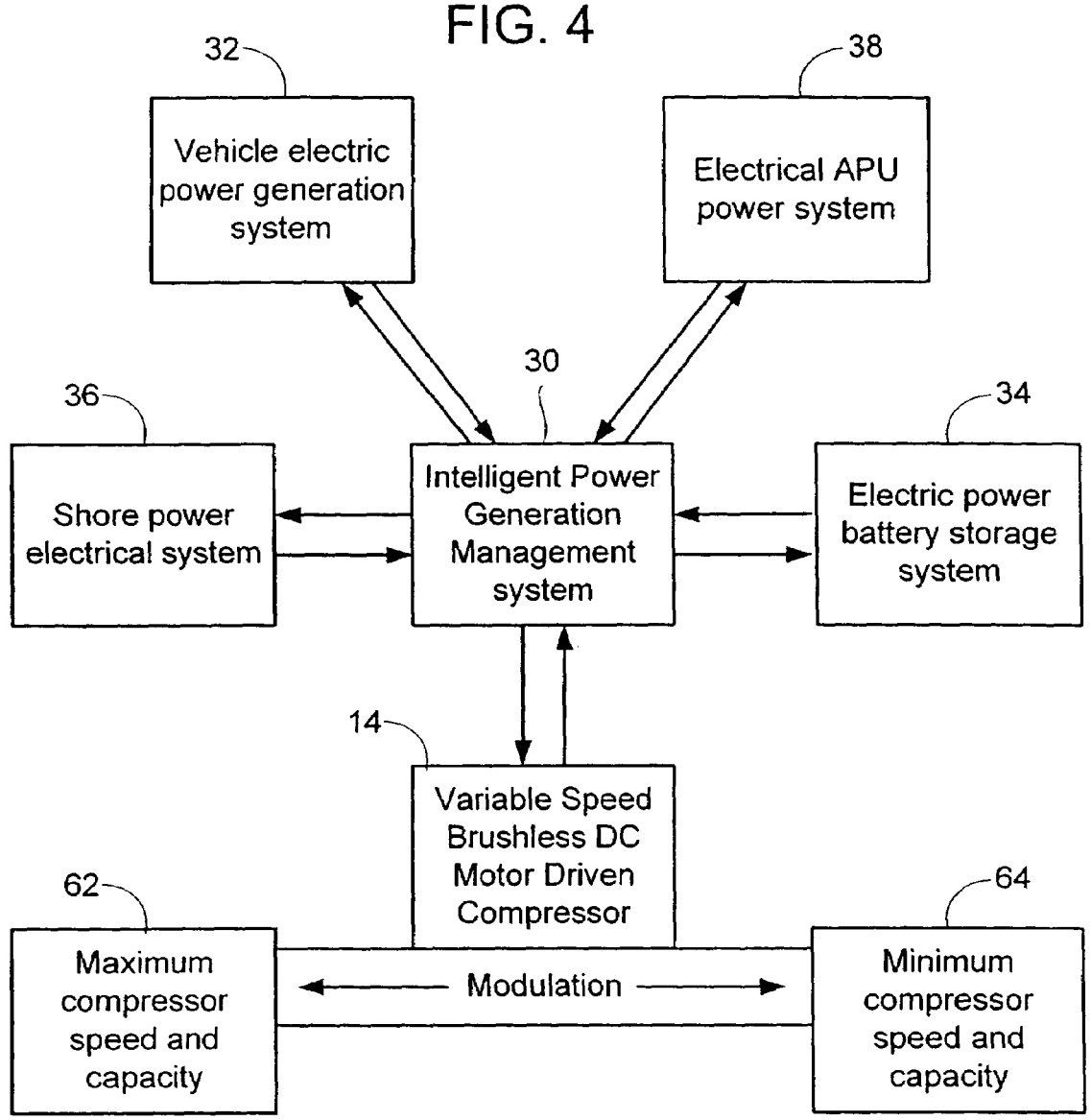
FIG. 4 is a simplified block diagram illustrating alternate power source utilization and compressor capacity modulation provided by the intelligent power generation management controller of an embodiment of the present invention.

As discussed briefly above and as illustrated in FIG. 4, the system of the present invention utilizes an intelligent power generation management controller 30 to modulate the speed, and therefore the capacity, of the variable speed brushless DC motor driven compressor 14. This output control can modulate the compressor 14 between a maximum compressor speed and capacity 62 during, for example, engine on operation or operation with an unlimited input power source such as the vehicle electrical power generation system 32 or a shore power electrical system 36, and a minimum compressor speed and capacity 64 during, for example, periods of operation utilizing limited sources of electrical power such as the electric power battery storage system 34 or an electrical auxiliary power unit power system 38. Operation at any speed and capacity between these two points 62, 64 is available as controlled by the intelligent power generation management controller 30. This controller 30 may also vary the modulation of compressor 14 when additional or different sources of power become available and as system parameters change to maintain optimal system performance.

For example, the controller 30 may operate the compressor 14 at maximum compressor speed and capacity while the vehicle is being driven to maintain the temperature of the passenger compartment of the vehicle at a user selected temperature. As the vehicle is parked and the engine is turned off, the controller 30 will sense the loss of the vehicle electric power generation system 32 and will begin to utilize electric power from the electric power battery storage system 34 to drive the compressor. The controller 30 will then reduce the compressor speed and capacity so as to not draw an excessive amount of power from the battery. The speed and capacity of the compressor may be increased as needs demand as determined by the controller 30. However, the controller 30 will not allow an amount of power to be discharged from the battery storage system 34 that would result in an insufficient amount of power remaining available to start the vehicle, or not allow an amount of power to be discharged from the battery storage system that will reduce the life of the system. As such a point is neared, the controller 30 will disable the power output to the compressor 14 thereby shutting down the HVAC system until and unless an additional source of power becomes available or the batteries are recharged. In one embodiment, this point is set at approximately 11.5 volts DC under load, although other set points may be appropriate based on the starting needs of the engine and battery life.

While the system is operating from the battery storage system 34, if the vehicle is connected to a shore power electrical system 36 the controller 30 will sense the availability of this new power source. The controller 30 will then begin utilizing this source to the exclusion of the battery system 34, and will increase the compressor speed and capacity as needed to maintain the temperature of the interior. If, instead, an auxiliary power unit on the vehicle is started, intelligent power generation management controller 30 will switch to this source of power to drive the compressor 14 to the exclusion of the battery storage system 34, and will increase the modulation of the compressor 14 as needed. However, unlike when the system is operated from the vehicle electric power generation system 32 or from the shore power electric system 36, the controller 30 may well reduce the modulation of the compressor 14 based upon the power draw and capacity of the APU power system 38. That is, the controller 30 recognizes that the APU power system 38 and the battery storage system 34 are limited resources that may be needed for other functions on the vehicle. As such, the controller 34 will ensure the conservation of some portion of these resources by disabling the HVAC system prior to exhaustion of these power sources.

Figure 5:
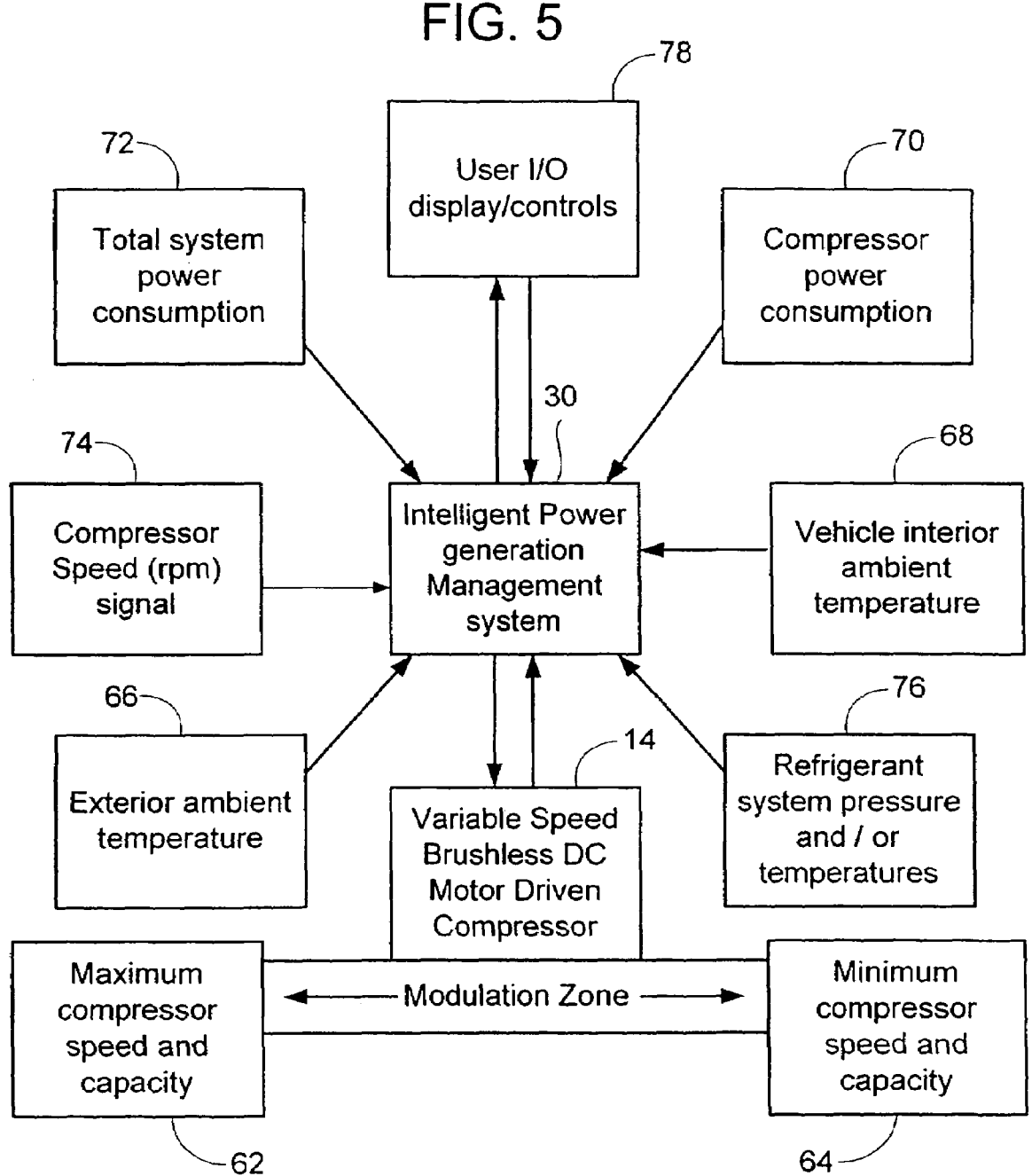
FIG. 5 is a simplified block diagram illustrating control parameter utilization and compressor capacity modulation provided by the intelligent power generation management controller of an embodiment of the present invention.

As illustrated in FIG. 5, the intelligent power generation management controller 30 monitor various system parameters to perform its modulation control function. Both the exterior ambient temperature 66 and the vehicle's interior ambient temperature 68 are monitored by the controller 30 to determine a compressor capacity to achieve and maintain the interior set point temperature. Typically, the larger the difference between the exterior and interior temperatures, the higher the capacity needed to maintain the differential. As the exterior ambient temperature 66 drops or the vehicle interior ambient temperature set point 68 rises the controller 30 may reduce the compressor speed and capacity and still maintain the user selected interior temperature.

The controller 30 also monitors the compressor power consumption 70 and the total system power consumption 72 in its modulation of the compressor speed and capacity. This information is used by the controller 30 to modulate the compressor 14 to ensure that the available power sources are not depleted beyond a predetermined power capacity for those times that a limited power source is being utilized. The controller 30 can reduce the compressor speed and capacity if the monitored power consumption exceeds appropriate levels. These parameters are also utilized to provide system protection from over load faults.

The controller 30 also monitors system parameters of the refrigeration system including the compressor speed 74 and the refrigerant system pressures and temperatures 76. The compressor speed signal 74 is utilized in the closed loop proportional, integral, derivative (PID) control of the compressor modulation. The refrigerant system pressures and/or temperatures are utilized as control parameters to regulate the compressor speed and capacity so that the power utilization is optimized. That is, the compressor modulation may be reduced once a temperature has been reached within the system to adequately cool the interior passenger compartments. Indeed, the compressor may be stopped altogether while the heat exchanger that cools the passenger compartments is at a temperature sufficient to provide adequate cooling. Once the temperature of this heat exchanger rises above a level sufficient to provide adequate cooling, the controller 30 may once again start the compressor 14 to reduce this temperature. In this way, the draw from the available power sources is minimized while still achieving the goal of providing adequate passenger cooling with the limited power sources available to drive the system. The system parameters also provide the controller 30 with the ability to detect faults within the system that reduce its ability to cool the interior compartment and that increase its power consumption.

System status display and control inputs may be provided between the controller 30 and the operator via a user input/output display 78 within the passenger compartment. When such a display 78 is utilized, communication of control parameters from the user may be provided to the controller 30 by means of a serial data link. Likewise, the display of system control and status information may be provided by the controller 30 to the display 78 by this serial data link. Control parameters from the user will typically include the desired operating mode of the HVAC system including off, heat, and cool modes of operation. Likewise a temperature setting may also be input through this I/O device 78.

In one embodiment of the present invention, the user may also select which of the available power sources should be utilized to drive the variable speed compressor. The controller 30 may also provide switching between available power sources as a source is depleted, or may query the user for authorization before providing such automatic source power transfer. Fan speed and interior compartment selection may also be controlled via the user I/O display or controls 78. System status information may also be displayed on the user I/O display 78 including interior and exterior temperatures, fan speed, mode selection, remaining available power, selected power source, available power sources, status and warning messages, etc.

In one embodiment of the present invention, the system allows adjustment of the following parameters via the display/control 78: compressor minimum control output; compressor maximum control output; maximum current draw; indoor unit minimum speed output; battery cutout voltage; compressor cooling control parameters kp, ki, and kd; and indoor fan heating control parameters Kp, Ki, and Kd. These parameters provide the proportional, integral, and derivative, or rate gains for the control PID equations. In this embodiment, the following parameters are reported to the display 78: operating mode; set temperature; cab temperature; discharge air temperature; battery voltage; battery current; and compressor commanded speed.

During operation, the intelligent power generation and management controller 30 processes the user inputs to determine the operational mode of the HVAC system. When the heating mode of operation is commanded by a user in the engine off (no idle) condition, the controller 30 commands a heater, e.g. coolant heater 50 illustrated in FIG. 2 or air heater 52 illustrated in FIG. 3, to turn on. These heaters may be fuel fired heaters or electric resistance heaters as appropriate. The controller 30 also controls the interior fan speed via a pulse width modulated (PWM) PID control loop in order to maintain the interior cab temperature at the set point. If, however, the user selects a cooling mode of operation, the condenser fan and pump outputs are turned on and the interior compartment fan is set to 100%. Initially, the compressor speed is set to the minimum capacity and speed setting. The controller 30 then modulates the speed and capacity of the compressor 14 to maintain the cab temperature at the user define set point via the PID control, except when certain conditions are encountered. These conditions include a high current/high load limit that reduces the compressor speed if the supply current exceeds a predefined current limit. In one embodiment, this current limit is set at 40 amps.

Similarly, if the requested compressor speed is at a minimum and the discharge air temperature is below the temperature set point, the compressor speed is set to zero, until the discharge air temperature is above the set point for more than a predetermined amount of time. Further, if the pressure sensing indicates a fault within the refrigeration the requested compressor speed will also be set to zero. The compressor will be disabled for a predetermined period of time before the compressor is allowed to be operated. Finally, if the battery voltage drops below a predetermined value load the controller 30 will disable all outputs until power has been cycled to the controller 30 or an alternate source of power becomes available.

While the system of the present invention provides significant advantages when integrated into a vehicle's HVAC system, many currently existing vehicles that already have a HVAC system installed would also benefit from such a system. However, the cost of removing a vehicle's current HVAC system and reinstalling the system of the present invention may well be cost prohibitive. Therefore, in an alternate embodiment of the present invention the components of the system are modularized for installation on a vehicle in addition to the currently existing HVAC system that is operable only during engine on operation. With this embodiment, the passenger compartment temperature may be controlled without running the engine.

Figure 6:
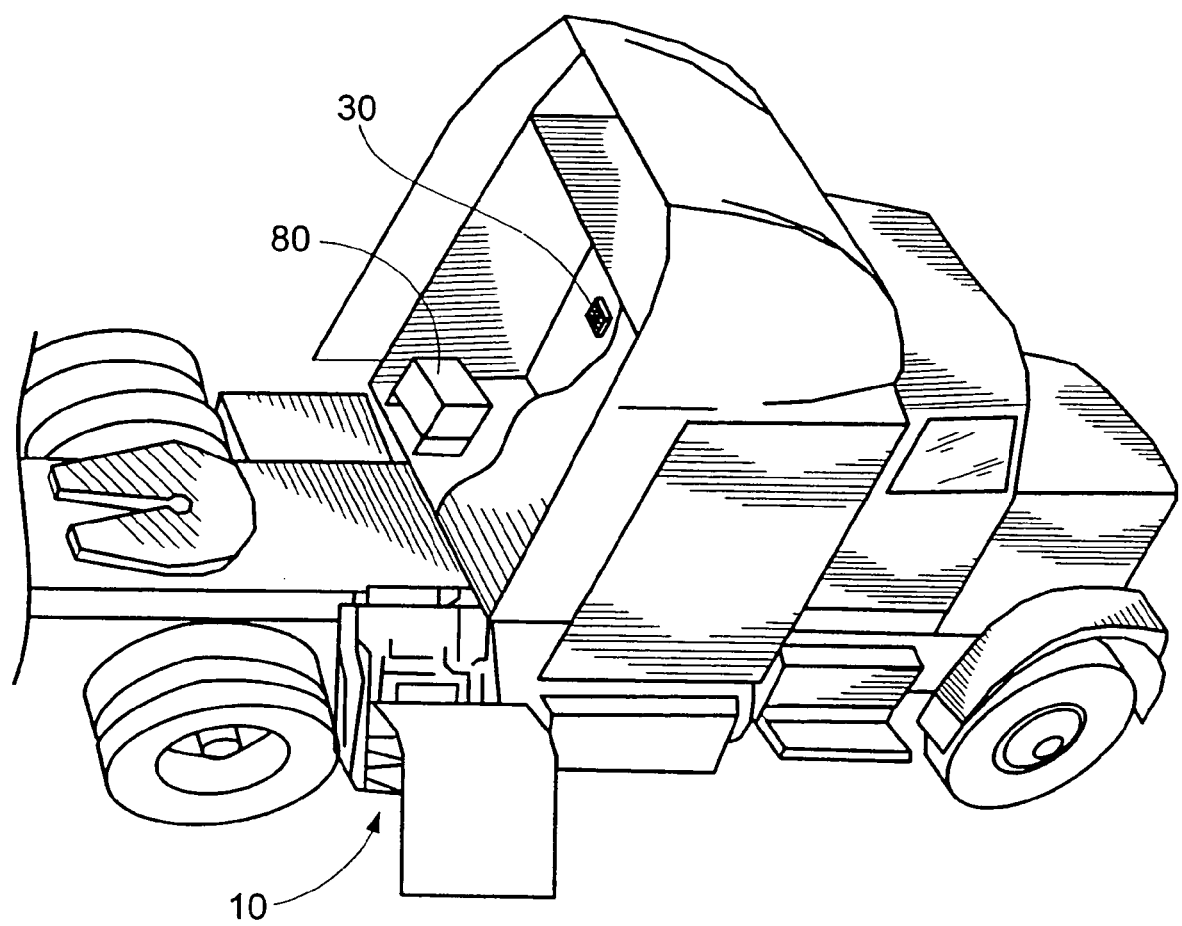
FIG. 6 is a simplified schematic diagram illustrating component placement in an over-the-road vehicle in accordance with one embodiment of the present invention.

Such a system installation is illustrated in exemplary locations in FIG. 6. As may be seen from this FIG. 6, the system 10 is provided a sealed refrigeration system with the variable speed brushless DC compressor and integrated coolant heater. This sealed unit may be installed in various locations within the interior or exterior of the vehicle. In FIG. 6, the installation of the sealed module is illustrated as being external to the engine and passenger compartments. Within the passenger compartment an inside HVAC unit 80 including a heat exchanger and fan is installed to provide the air conditioning of the passenger compartment. This interior unit 80 may also include an air heater if a coolant heater is not included with sealed system 10. In this embodiment the intelligent power generation management controller 30 is also installed within the passenger compartment. Through this controller 30 the users may control the system of the present invention and receive read out information.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A vehicle air conditioning system operable to provide engine on and engine off operation to provide air conditioning to sleeping area of the vehicle, the vehicle including an engine and an electric power generation system, comprising:
a variable-speed compressor;
a DC motor operably coupled to the variable-speed compressor;
at least one battery electrically coupled to the electric power generation system;

a controller operably coupled to the motor, the controller receiving electric power from the electric power generation system when the engine is on to enable operation of the compressor, the controller receiving electric power from the battery when the engine is off to enable operation of the compressor during an engine off condition, wherein the controller monitors a power consumption from the battery, and wherein the controller reduces the speed of the compressor when the power consumption exceeds a predetermined set point.

2. The system of claim 1, wherein operation of the compressor is disabled when a voltage of the battery drops below a predetermined set point.

3. The system of claim 2, wherein the controller disables operation of the compressor when a voltage of the battery drops below a predetermined set point.

4. An air conditioning system for use to provide air conditioning to a sleeping area of a vehicle, having an engine and an electric power generation and storage system, while its engine is either operating or not operating, comprising: a variable-speed compressor; a variable-speed motor operably coupled to the variable-speed compressor; a controller operably coupled to the motor, the controller receiving electric power from the electric power generation and storage system; and wherein the controller controls a speed of the compressor via the motor using electric power from the vehicle's electric power generation and storage system when the engine is not operating based on user determined cooling needs for the vehicle, wherein the controller monitors a power consumption from the power generation and storage system, and wherein the controller reduces the speed of the compressor when the power consumption exceeds a predetermined set point.

5. The system of claim 4, wherein operation of the compressor is disabled when a voltage of the vehicle's electric power generation and storage system drops below a predetermined set point.

6. The system of claim 4, wherein the controller increases the speed of the compressor based on an increased demand for cooling.

7. The system of claim 4, wherein the controller decreases the speed of the compressor based on a decreased demand for cooling.

8. The system of claim 4, wherein the electric power generation and storage system comprises at least one battery dedicated to providing electric power to the controller to enable operation of the compressor during an engine off condition.

9. A vehicle air conditioning system operable to provide engine on and engine off operation to provide air conditioning to a sleeping area of the vehicle, the vehicle including an engine and an electric power generation and storage system including an alternator and at least one battery, comprising:
a variable-speed compressor;
a DC motor operably coupled to the variable-speed compressor;
a controller operably coupled to the motor, the controller receiving electric power from the at least one battery when the engine is off to enable operation of the compressor during an engine off condition; and
wherein the controller monitors at least one of the air conditioning system pressures and temperatures the air conditioning system to determine a power capacity draw of the vehicle air conditioning system; and
wherein the controller modulates the speed of the compressor when the engine is not operating by varying the energization of the motor based on the power capacity draw from the at least one battery.

10. The system of claim 9, wherein operation of the compressor is disabled when a voltage of the battery drops below a predetermined set point.

11. The system of claim 10, wherein the controller disables operation of the compressor when a voltage of the battery drops below a predetermined set point.

12. A vehicle air conditioning system operable to provide engine on and engine off operation to provide air conditioning to a sleeping area of the vehicle, the vehicle having an engine and an electric power generation system, comprising:
a variable-speed compressor;
a motor operably coupled to the variable-speed compressor;
a controller operably coupled to the motor, the controller receiving electric power from the electric power generation system when the engine is on to enable operation of the compressor during an engine on condition, and the controller receiving electric power from at least one battery when the engine is off to enable operation of the compressor during an engine off condition;
a heater operatively coupled to the controller, and wherein the controller disables the compressor and operates the heater to provide heating to an interior compartment of the vehicle, and wherein the controller operates the heater based on the power capacity of the source of electric power to prolong operation of the HYAC system during an engine off condition when interior heating is required.

13. The system of claim 12, wherein the controller modulates the speed of the compressor when the engine is not operating by varying the energization of the motor based on at least one of the air conditioning system's refrigerant temperatures and pressures.

14. The system of claim 12, wherein the controller modulates the speed of the compressor when the engine is not operating by varying the energization of the motor based on electrical power demands of the system.

15. The system of claim 12, wherein the controller modulates the speed of the compressor when the engine is not operating by varying the energization of the motor based on ambient operating conditions of the vehicle's environment.

16. The system of claim 12, wherein the heater comprises a coolant heater.

17. The system of claim 12, wherein the heater comprises a fuel fired type air heater.

* * * * *

UNITED STATES PATENT AND TRADEMARK OFFICE
CERTIFICATE OF CORRECTION

PATENT NO. : 7,454,922 B2
APPLICATION NO. : 11/337624
DATED : November 25, 2008
INVENTOR(S) : Terry Zeigler et al.

It is certified that error appears in the above-identified patent and that said Letters Patent is hereby corrected as shown below:

In column 12, lines 4 and 5, "temperatures the air conditioning system" should be changed to
-- the air conditioning system temperatures --.

Signed and Sealed this
Twenty-sixth Day of April, 2011

David J. Kappos
*Director of the United States Patent and Trademark Office*